(12) United States Patent
Iezaki et al.

(10) Patent No.: US 7,999,967 B2
(45) Date of Patent: Aug. 16, 2011

(54) PRINT CONTROL APPARATUS, PRINTING APPARATUS, PRINT CONTROL METHOD, AND PROGRAM THEREOF

(75) Inventors: Hiroshi Iezaki, Sapporo (JP); Mitsuru Annen, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 360 days.

(21) Appl. No.: 12/378,295

(22) Filed: Feb. 13, 2009

(65) Prior Publication Data
US 2009/0284765 A1 Nov. 19, 2009

(30) Foreign Application Priority Data

Feb. 14, 2008 (JP) ................................. 2008-032982

(51) Int. Cl.
*H04N 1/60* (2006.01)
*G06F 3/12* (2006.01)
(52) U.S. Cl. ...... 358/1.18; 358/1.15; 358/537; 358/539; 345/581; 715/273
(58) Field of Classification Search .................... 358/1.9, 358/1.13, 1.15, 1.18, 1.5, 518, 537, 539, 358/527; 345/581, 594, 619, 660; 715/273
See application file for complete search history.

(56) References Cited

U.S. PATENT DOCUMENTS

| | | | |
|---|---|---|---|
| 7,027,172 B1* | 4/2006 | Parulski et al. | 358/1.15 |
| 7,305,457 B2* | 12/2007 | Yajima et al. | 358/1.15 |
| 7,474,423 B2* | 1/2009 | Garcia et al. | 358/1.15 |
| 7,557,950 B2* | 7/2009 | Hatta et al. | 358/1.9 |
| 7,626,716 B2* | 12/2009 | Hayashi | 358/1.15 |
| 7,751,070 B2* | 7/2010 | Sato | 358/1.13 |
| 7,764,393 B2* | 7/2010 | Yamada et al. | 358/1.15 |
| 7,830,539 B2* | 11/2010 | Yajima et al. | 358/1.15 |
| 2002/0016833 A1* | 2/2002 | Yajima et al. | 709/220 |
| 2005/0213151 A1* | 9/2005 | Yajima et al. | 358/1.15 |
| 2007/0133052 A1* | 6/2007 | Yamada et al. | 358/1.15 |
| 2008/0022327 A1* | 1/2008 | Murray et al. | 725/82 |
| 2009/0003731 A1* | 1/2009 | Nitta et al. | 382/298 |
| 2009/0201316 A1* | 8/2009 | Bhatt et al. | 345/660 |
| 2009/0204894 A1* | 8/2009 | Bhatt et al. | 715/273 |
| 2009/0204895 A1* | 8/2009 | Bhatt et al. | 715/273 |
| 2010/0026706 A1* | 2/2010 | Yamaji et al. | 345/594 |

FOREIGN PATENT DOCUMENTS

| | | |
|---|---|---|
| JP | 2000-351247 | 12/2000 |
| JP | 2005-199575 | 7/2005 |
| JP | 2007-281704 | 10/2007 |

* cited by examiner

*Primary Examiner* — Kimberly A Williams
(74) *Attorney, Agent, or Firm* — Nutter McClennen & Fish LLP; John J. Penny, Jr.

(57) ABSTRACT

Provided is a print control apparatus including a display image processing unit and a printing process unit so as to execute a printing process, wherein the display processing unit includes a unit arranging a plurality of images in a predetermined layout and acquiring an arrangement printing instruction for executing printing; a unit outputting the arrangement printing instruction, which is a printing output instruction, to the printing process unit using at least one specified image and layout information of the image; a unit outputting an arrangement image generation instruction for generating the arrangement image data to the printing process unit using at least one specified image and layout information which is information about the arrangement of the image; a unit which, when arrangement image data of a predetermined format is acquired from the printing process unit as a response of the arrangement image generation instruction, generates display image data from the acquired arrangement image data and outputs the generated display image data to a display unit; and a display image processing unit.

10 Claims, 8 Drawing Sheets

FIG. 5
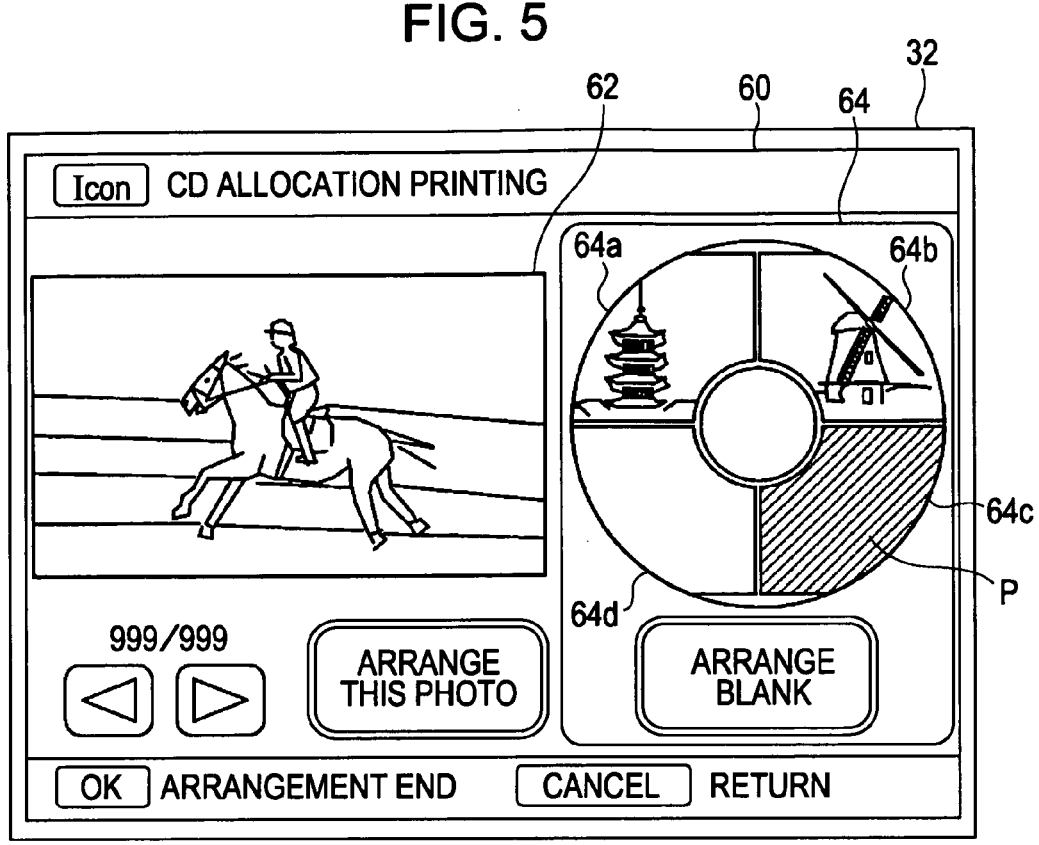
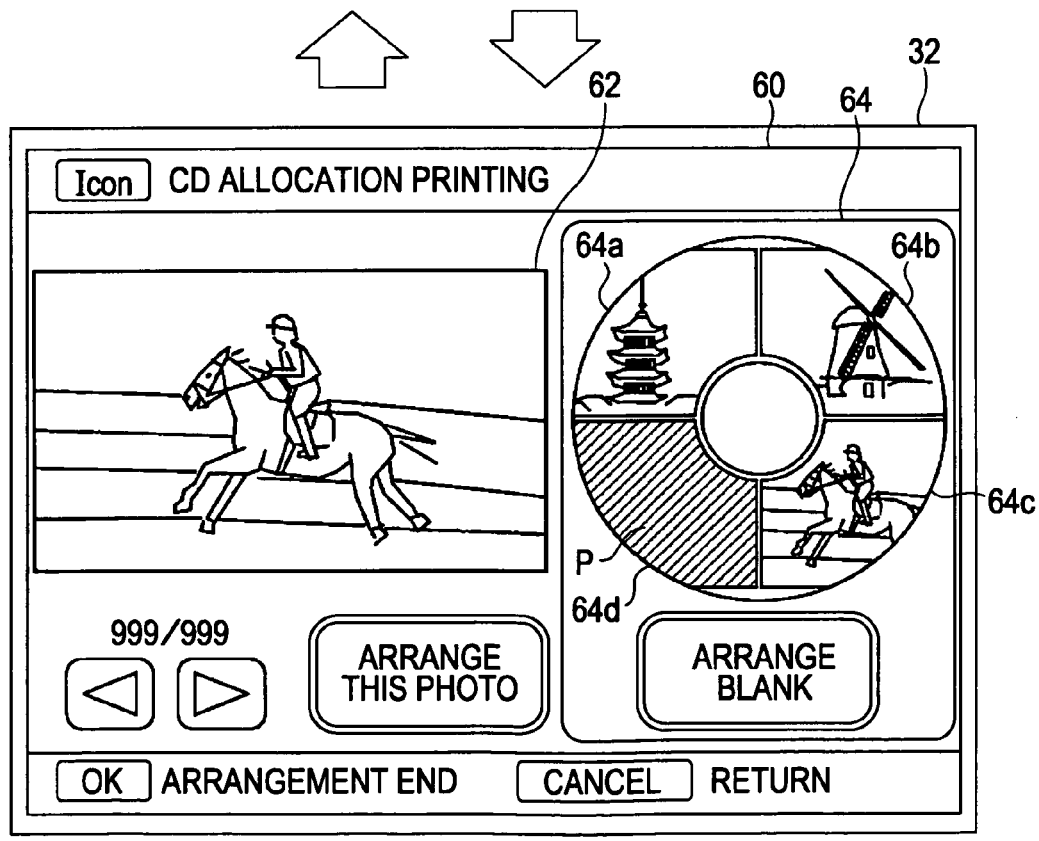

FIG. 7
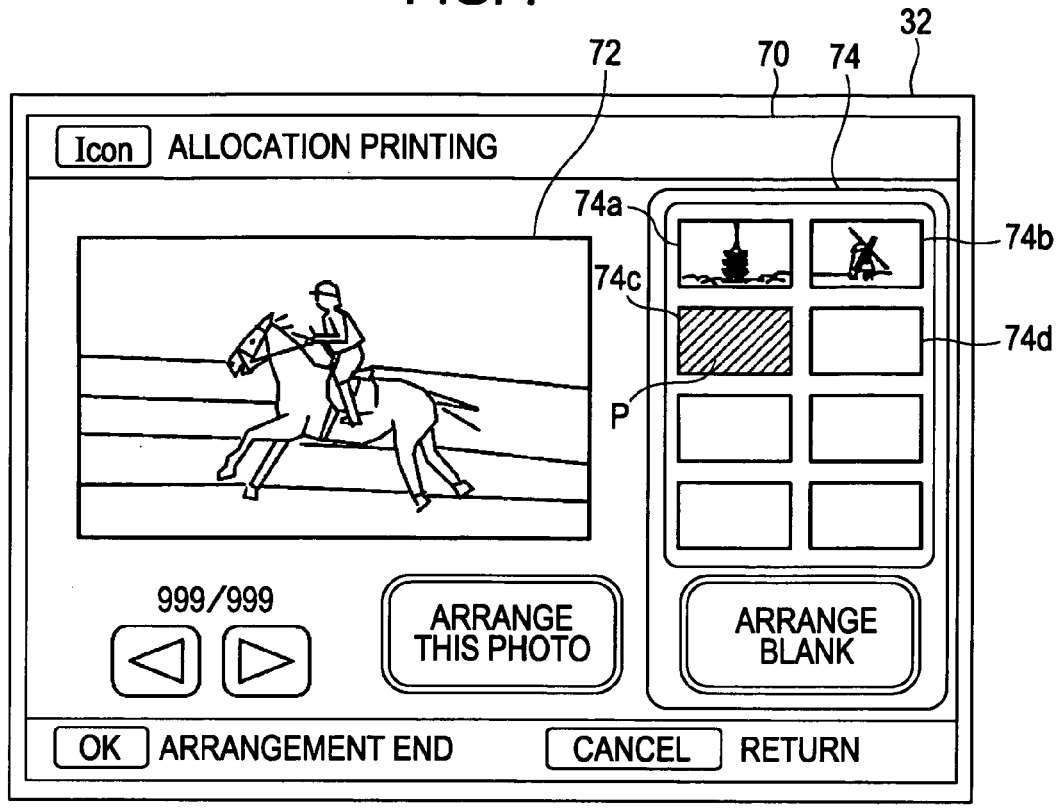
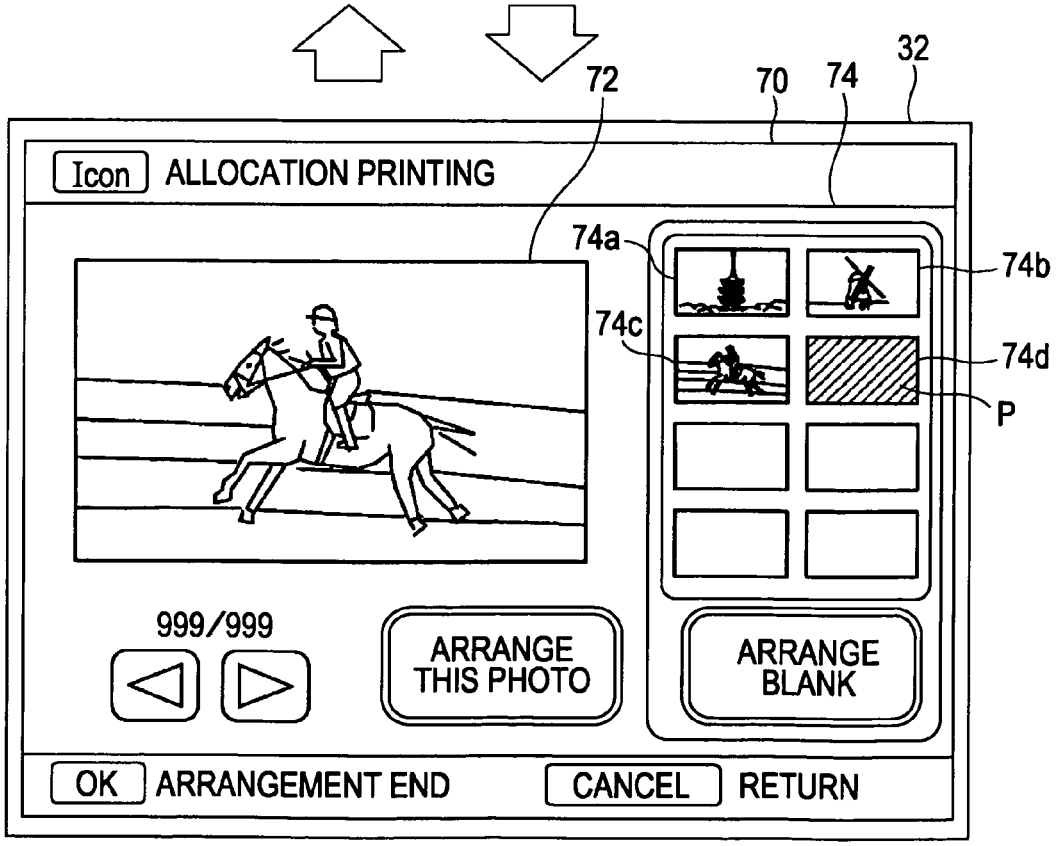

PRINT CONTROL APPARATUS, PRINTING APPARATUS, PRINT CONTROL METHOD, AND PROGRAM THEREOF

The entire disclosure of Japanese Patent Application No. 2008-032982, filed Feb. 14, 2008 is expressly incorporated by reference herein.

BACKGROUND

1. Technical Field

The present invention relates to a print control apparatus, a printing apparatus, a print control method and a program thereof.

2. Related Art

As a printing apparatus, a printing apparatus for arranging a plurality of images such as a photographic image and a frame image and printing and displaying the images, in which a mechanism for generating display image data by arranging the plurality of images is provided at a display side and a mechanism for generating printing image data in which the plurality of images are arranged is provided at a print side, is suggested (for example, see JP-A-2007-281704 (FIG. 2). In the apparatus described in JP-A-2007-281704, the setting of a clipping region can be supported by setting the clipping region on an upper part of the photographic image when the photo frame is horizontally oriented and the photographic image is vertically oriented.

However, in the printing apparatus described in JP-A-2007-281704, a configuration for preparing the image in which the plurality of images are arranged includes two configurations, that is, a display configuration and a print configuration. Accordingly, the configuration is complicated. In addition, for example, it may be also considered that a plurality of preview images are arranged so as to achieve a display. However, in this case, a deviation occurs in the displayed image and the printed image.

SUMMARY

An advantage of some aspects of the invention is that it provides a print control apparatus, a printing apparatus, a print control method, and a program thereof, which are capable of simplifying a configuration when a plurality of images is laid out and providing an image closer to a printed image.

The invention employs the following units in order to achieve the above-described advantages.

According to an aspect of the invention, there is provided a print control apparatus generating arrangement image data in which a plurality of images is arranged and executing a printing process, the print control apparatus including: a display image processing unit generating display image data from an original image, outputting the generated display image data to a display unit, arranging the plurality of images in a predetermined layout, outputting an arrangement printing instruction, which is a printing output instruction, using at least one specified image and layout information which is information about arrangement of the image when the arrangement printing instruction for executing printing is acquired, outputting an arrangement image generation instruction for generating the arrangement image data using at least one specified image and layout information which is information about the arrangement of the image, generating display image data from the acquired arrangement image data and outputting the generated display image data to the display unit when arrangement image data of a predetermined format is acquired as a response of the arrangement image generation instruction; and a printing process unit generating printing image data of the arrangement image data using at least one image specified by the arrangement printing instruction and the layout information when the arrangement printing instruction is acquired, outputting the generated printing image data to a printing mechanism for forming an image on a printing medium using a coloring agent, generating the arrangement image data using at least one image specified by the arrangement image generation instruction and the layout information when the arrangement image generation instruction is acquired, and outputting the generated arrangement image data to the display image processing unit.

In the print control apparatus, the arrangement image generation instruction for generating the arrangement image data, in which the plurality of images is arranged, is output to the printing process unit using at least one specified image and layout information which is information about the arrangement of the image, the arrangement image data is generated using at least one image specified by the arrangement image generation instruction and layout information when the output arrangement image generation instruction is acquired, the generated arrangement image data is output to the display image processing unit, the display image data is generated from the acquired arrangement image data by the display image processing unit when the arrangement image data is acquired, and the generated display image data is output to the display unit. In addition, the plurality of images is arranged in the predetermined layout, the arrangement printing instruction, which is the printing output instruction, is output to the printing process unit using at least one specified image and layout information when the output arrangement printing instruction for executing printing is acquired, the printing image data of the arrangement image data is generated by the printing process unit using at least one image specified by the arrangement printing instruction and the layout information when the arrangement printing instruction is acquired, and the generated printing image data is output to the printing mechanism for forming the image on the printing medium using the coloring agent. If the plurality of images is arranged, since the printing process unit for executing the printing process prepares the laid-out display image data and printing image data, that is, prepares common layout data, the plurality of units for arranging the plurality of images may not be included. In addition, since the printing process unit for actually performing printing prepares the display image, it is possible to suppress a difference between the display image and the printing image. Accordingly, when the plurality of images is laid out, the configuration can be more simplified and an image closer to the printed image can be provided.

The print control apparatus of the invention may further include a storage unit storing data, and a file processing unit sending or receiving an image file of a predetermined format to or from the printing process unit as an analyzable data, the display image processing unit may have an image expansion unit which expands an original image compressed in a predetermined format to image data, the display image data may be generated by expanding the original image of the image specified by the arrangement image generation instruction by the image expanding unit, and the generated display image data may be stored in the storage unit as a virtual image file of the predetermined format, and the printing process unit may acquire the virtual image file stored in the storage unit via the file processing unit as the at least one image specified by the arrangement image generation instruction when the arrangement image generation instruction is acquired, generate the arrangement image data using the acquired virtual image file, and store the generated arrangement image data in the storage unit as a virtual arrangement image file. In the printing process unit, the printing data is generated on the image file (for example, a bitmap file or the like) of a predetermined format. Since the single display image data used for display is converted into the virtual image file and the virtual image file is used for generating the arrangement image, the expansion of the original image can be omitted when the display image is prepared. Thus, the process of arranging and displaying the plurality of images can be executed for a shorter time.

In the print control device of the invention, the display image processing unit may have a data converting unit which converts data of a predetermined format into data of a format capable of being displayed by the display unit and generate display image data from the original image by the data converting unit, the printing process unit may generate the arrangement image data using the data converted by the data converting unit, and the display image processing unit may generate the display image data from the acquired arrangement image data by the data converting unit when the arrangement image data of the predetermined format is acquired as the response of the arrangement image generation instruction. Although the data formats used in the display image processing unit and the printing process unit may be different, since the data format used by the display image processing unit is converted, the image can be properly displayed.

In the print control apparatus of the invention, the display image processing unit may output the arrangement image generation instruction including information about an arrangement location indication image which is an image of a location, in which an image is next arranged, of image arrangement locations of display images having a plurality of image arrangement locations, and generate the display image data from the acquired arrangement image data when the arrangement image data including the arrangement location indication image is acquired as the response of the arrangement image generation instruction, and the printing process unit may generate the arrangement image data including the arrangement location indication image when the arrangement image generation instruction including the arrangement location indication image is acquired. In this case, since the arrangement image data is generated so as to view the location where the image is next arranged, the image for easily recognizing the location where the image is next arranged can be provided.

In the print control apparatus of the invention, the printing process unit may generate the arrangement image data obtained by trimming the whole image, in which a plurality of images is arranged, in a predetermined shape when the arrangement image data is generated, and output the generated arrangement image data to the display image processing unit. In this case, since the arrangement image can be trimmed in the predetermined shape by the printing process unit and the display image processing unit may not include the trimming function, the configuration can be more simplified. The "predetermined shape" may be, for example, a circular plate shape having a hole in the central portion thereof.

In the print control apparatus of the invention, the display image processing unit may generate display image data having a smaller size than that of the printing process when the display image data is generated from the original image, and the printing process unit may generate the arrangement image data using the display image data having the smaller size. In this case, since a processing load can be reduced, the process of arranging and displaying the plurality of images can be executed for a shorter time.

In the print control apparatus of the invention, the display image processing unit may have information about display fonts used for displaying a character image, generate display image data of the character image from the original image of the character image using the display fonts, and output the generated display image data to the display unit, and the printing process unit may have a larger number of printing font information than the number of display fonts, and generate the arrangement image data from the character image specified by the arrangement image generation instruction using the printing fonts when the arrangement image generation instruction is acquired. By this configuration, since the display image is generated using printing fonts having a larger number of fonts, it is possible to more accurately display the character. In addition, it is possible to display more characters without increasing the types of the display fonts of the display processing unit.

According to another aspect of the invention, there is provided a printing apparatus including: the above-described print control apparatus; a display unit displaying and outputting a display image acquired from the print control apparatus; and a printing mechanism printing and outputting printing image data acquired from the print control apparatus on a printing medium. Since the printing apparatus includes the print control apparatus, the same effect can be obtained. That is, when the plurality of images is laid out, the configuration can be more simplified and an image closer to the printed image can be provided.

According to another aspect of the invention, there is provided a print control method using a display image processing unit generating display image data from an original image and outputting the generated display image data to a display unit, and a printing process unit generating arrangement image data in which a plurality of images is arranged and executing a printing process, the method including: outputting an arrangement image generation instruction for generating the arrangement image data from the display image processing unit to the printing process unit using at least one specified image and the layout information which is information about the arrangement of the image; when the output arrangement image generation instruction is acquired, generating the arrangement image data using at least one image specified by the arrangement image generation instruction and layout information and outputting the generated arrangement image data from the printing process unit to the display image processing unit; when the arrangement image data is acquired, generating display image data from the acquired arrangement image data by the display image processing unit and outputting the generated display image data to the display unit; arranging a plurality of images in a predetermined layout and outputting an arrangement printing instruction, which is the printing output instruction, from the display image processing unit to the printing process unit using at least one specified image and layout information which is information about the arrangement of the image when the arrangement printing instruction for executing printing is acquired; and generating printing image data of the arrangement image data by the printing process unit using at least one image specified by the arrangement printing instruction and the layout information when the output arrangement printing instruction is acquired, and outputting the generated printing image data to a printing mechanism for forming an image on a printing medium using a coloring agent.

In the print control method, the arrangement image generation instruction for generating the arrangement image data, in which the plurality of images is arranged, is output to the printing process unit using at least one specified image and layout information which is information about the arrangement of the image, the arrangement image data is generated using at least one image specified by the arrangement image generation instruction and layout information when the output arrangement image generation instruction is acquired, the generated arrangement image data is output to the display image processing unit, the display image data is generated from the acquired arrangement image data by the display image processing unit when the arrangement image data is acquired, and the generated display image data is output to the display unit. In addition, the plurality of images is arranged in the predetermined layout, the arrangement printing instruction, which is the printing output instruction, is output to the printing process unit using at least one specified image and layout information when the arrangement printing instruction for executing printing is acquired, the printing image data of the arrangement image data is generated by the printing process unit using at least one image specified by the arrangement printing instruction and the layout information when the output arrangement printing instruction is acquired, and the generated printing image data is output to the printing mechanism for forming the image on the printing medium using the coloring agent. If the plurality of images is arranged, since the printing process unit for executing the printing process prepares the laid-out display image data and printing image data, that is, prepares common layout data, the plurality of units for arranging the plurality of images may not be included. In addition, since the printing process unit for actually performing printing prepares the display image, it is possible to suppress a difference between the display image and the printing image. Accordingly, when the plurality of images is laid out, the configuration can be more simplified and an image closer to the printed image can be provided. In addition, various aspects of the print control apparatus may be employed in the above-described print control method, and steps of realizing the functions of the above-described print control apparatus may be added.

According to another aspect of the invention, there is provided a program stored thereon for executing the steps of the above-described print control method on one or plurality of computers. This program may be recorded on a computer-readable recording medium (for example, a hard disc, a ROM, a FD, a CD, a DVD or the like), may be distributed from a computer to another computer via a transfer medium (a communication network such the Internet or a LAN), or may be transmitted or received by other methods. When this program is executed on one computer or a plurality of computers, the steps of the above-described print control method are executed and thus the same effect as the control method can be obtained.

BRIEF DESCRIPTION OF THE DRAWINGS

The invention will be described with reference to the accompanying drawings, wherein like numbers reference like elements.

FIG. 5 is a view explaining an example of a CD allocation printing screen.

FIG. 7 is a view explaining an example of an allocation printing screen.

DESCRIPTION OF EXEMPLARY EMBODIMENTS

Figure 1:
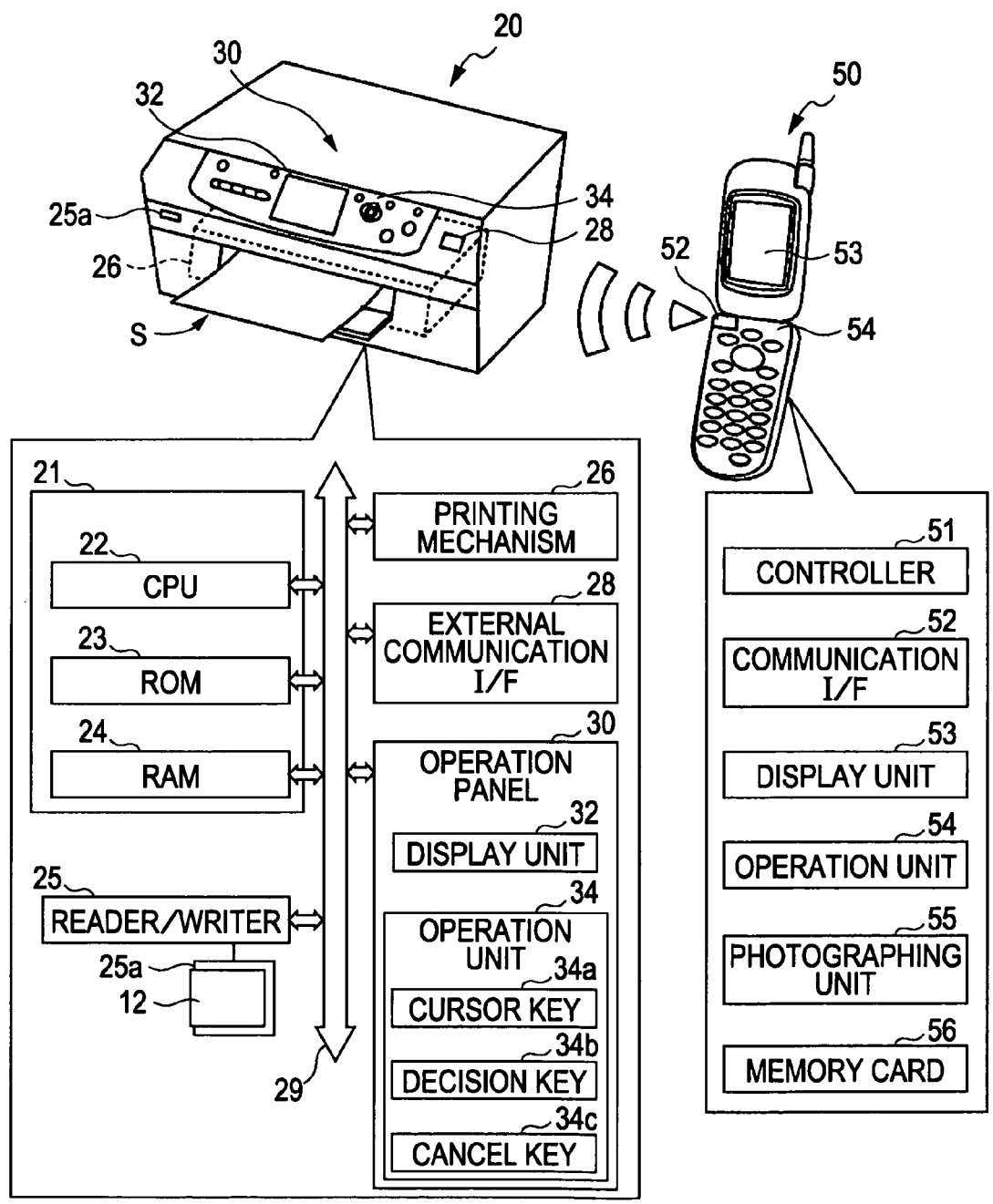
FIG. 1 is a schematic view showing the configuration of a printer and a mobile telephone.

Next, the embodiments of the invention will be described with reference to the accompanying drawings. FIG. 1 is a schematic view showing the configuration of a printer 20 and a mobile telephone 50 of an embodiment of the invention. The printer 20 includes a controller 21 for controlling the whole apparatus, a reader/writer 25 for inputting/outputting data to/from a memory card 12 mounted in a slot 25a, a printing mechanism 26 for printing an image on a recording sheet S, an external communication interface (I/F) 28 for inputting/outputting information to/from an external device (for example, the mobile telephone 50) by, for example, radio such as an infrared ray, and an operation panel 30 for displaying information to a user and inputting an instruction of the user. The controller 21 is constituted by a microprocessor mainly including a CPU 22, and includes a flash ROM 23 for storing and erasing information and storing various types of application programs or various types of data files and a RAM 24 for temporarily storing data. In the RAM 24, a cache area for temporarily storing an image displayed on the operation panel 30 is provided. The printing mechanism 26 is, although not shown, an ink jet type mechanism for pressurizing inks of respective colors, ejecting the pressurized inks onto a recording sheet S, and performing a printing process. In addition, the mechanism for pressurizing the inks may be operated by deformation of a piezoelectric element or generation of air bubbles due to heat of a heater. The operation panel 30 is a device for allowing the user to input various types of instructions to the printer 20 and includes a display unit 32 which is a color liquid crystal panel for displaying characters or images according to the various types of instructions as a touch panel or an operation unit 34 for inputting the instructions of the user by various types of buttons. In the operation unit 34, a cursor key 34a pressed when a cursor is moved in all directions, a decision key 34b pressed when a selection target is decided, and a cancel key 34c pressed at the time of cancel are provided. The controller 21, the reader/writer 25, the printing mechanism 26, the external communication I/F 28 and the operation panel 30 are electrically connected by buses 29. The memory card 12 is a non-volatile memory which can write and erase data, and a plurality of image files photographed by a photographing device such as a digital camera is stored. In the image files, an image file compressed in a predetermined format (e.g., a JPEG format) and a thumbnail image thereof are stored.

Figure 2:
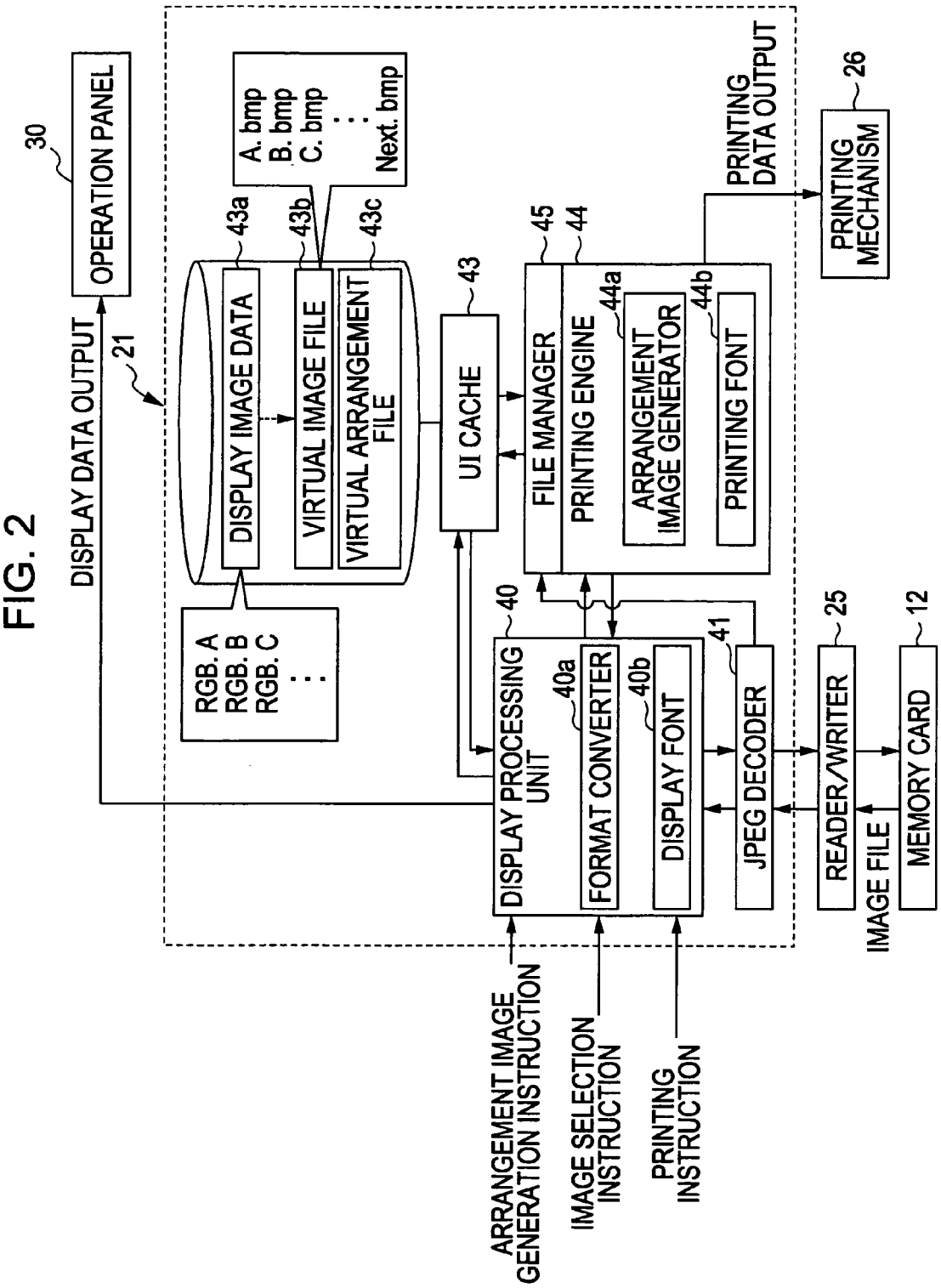
FIG. 2 is a block diagram showing an example of a functional configuration of a controller.

In addition, as shown in FIG. 2, the controller 21 includes a display processing unit 40 for receiving an instruction from the operation unit 34, converting original image data (JPEG data) acquired from the memory card 12 into data of a displayable format of the display unit 32, and outputting the data to the display unit 32; a JPEG decoder 41 for expanding the original image data (JPEG data) compressed and stored in the memory card 12 to expansion image data (for example, bitmap data); a UI cache 43 for temporarily caching various types of image data in a predetermined area of the RAM 24; a printing engine 44 for converting the expansion image data into printing image data of a printable format of the printing mechanism 26 and outputting the printing image data to the printing mechanism 26; and a file manager 45 for exchanging a file of a predetermined identifiable format between any one of the JPEG decoder 41 and the UI cache 43 and the printing engine 44.

The display processing unit 40 mainly converts the thumbnail image stored in the memory card 12 into the display image data, stores the converted display image data in the UI cache 43, and reads the display image data stored in the UI cache 43 when necessary. The display processing unit 40 includes a format convertor 40a for converting the expansion image data expanded by the JPEG decoder 41 into display image data (for example, RGB data) which can be displayed by the display unit 32 and a display font 40b which is character image data for display output. The format converter 40a is a module for performing image data conversion and has a function for virtually converting display image data 43a and generating a virtual image file 43b. The format converter 40a receives an arrangement image generation instruction from the operation unit 34 and then performs a conversion process of the display image data 43a into the virtual image file 43b. In addition, the display processing unit 40 does not have a function for performing a process of synthesizing two images. The UI cache 43 stores the display image data 43a generated by the format converter 40a and used for the display of the display unit 32, the virtual image file 43b generated by virtually converting the display image data 43a by the format converter 40a, and a virtual display image file 43c in which a plurality of images prepared by the printing engine 44 is arranged.

The printing engine 44 has a function for generating the printing image data, which can be printed by the printing mechanism 26, from the expansion image data expanded by the JPEG decoder 41 and acquired by the file manager 45. The printing engine 44 includes an arrangement image generator 44a having a function for generating arrangement image data in which a plurality of images is arranged or a printing font 44b which is character image data for print output and has the number of fonts larger than that of the display font 40b. The arrangement image generator 44a has a function for generating the arrangement image data, in which the plurality of images is arranged, on the basis of the expansion image data expanded by the JPEG decoder 41 and layout information and converting the generated arrangement image data into the printing image data used for the printing mechanism 26, on the basis of the request from display processing unit 40. In addition, the arrangement image generator 44a has a function for generating the arrangement image data, in which the plurality of images is arranged, on the basis of the display image data 43a and the layout information and converting the generated arrangement image data into the virtual display image file 43c, on the basis of a request from the display processing unit 40. The layout information includes information such as the number of images arranged, an image size, an arrangement location, and a whole shape, and is stored in a flash ROM 23. In addition, since the display image data 43a is converted from image data having a thumbnail size, the virtual display image file 43c generated from the arrangement image data has a size significantly smaller than that of the printing image data generated from the arrangement image data.

As shown in FIG. 1, the mobile telephone 50 includes a controller 51 for controlling the whole apparatus, a communication interface (I/F) 52 for inputting/outputting information to/from an external apparatus (for example, the printer 20) by, for example, radio such as an infrared ray, a display unit 53 which is a color liquid crystal panel for displaying characters or images according to various types of instructions, an operation unit 54 for inputting an instruction of a user by various types of buttons, a photographing unit 55 which includes a lens or a light-receiving element and photographs an image, and a memory card 56 for storing a plurality of image files (JPEG files) photographed by the photographing unit 55. The mobile telephone 50 has a function for transmitting the image file stored in the memory card 56 to the printer 20 via the communication I/F 52 and performing printing.

Figure 3:
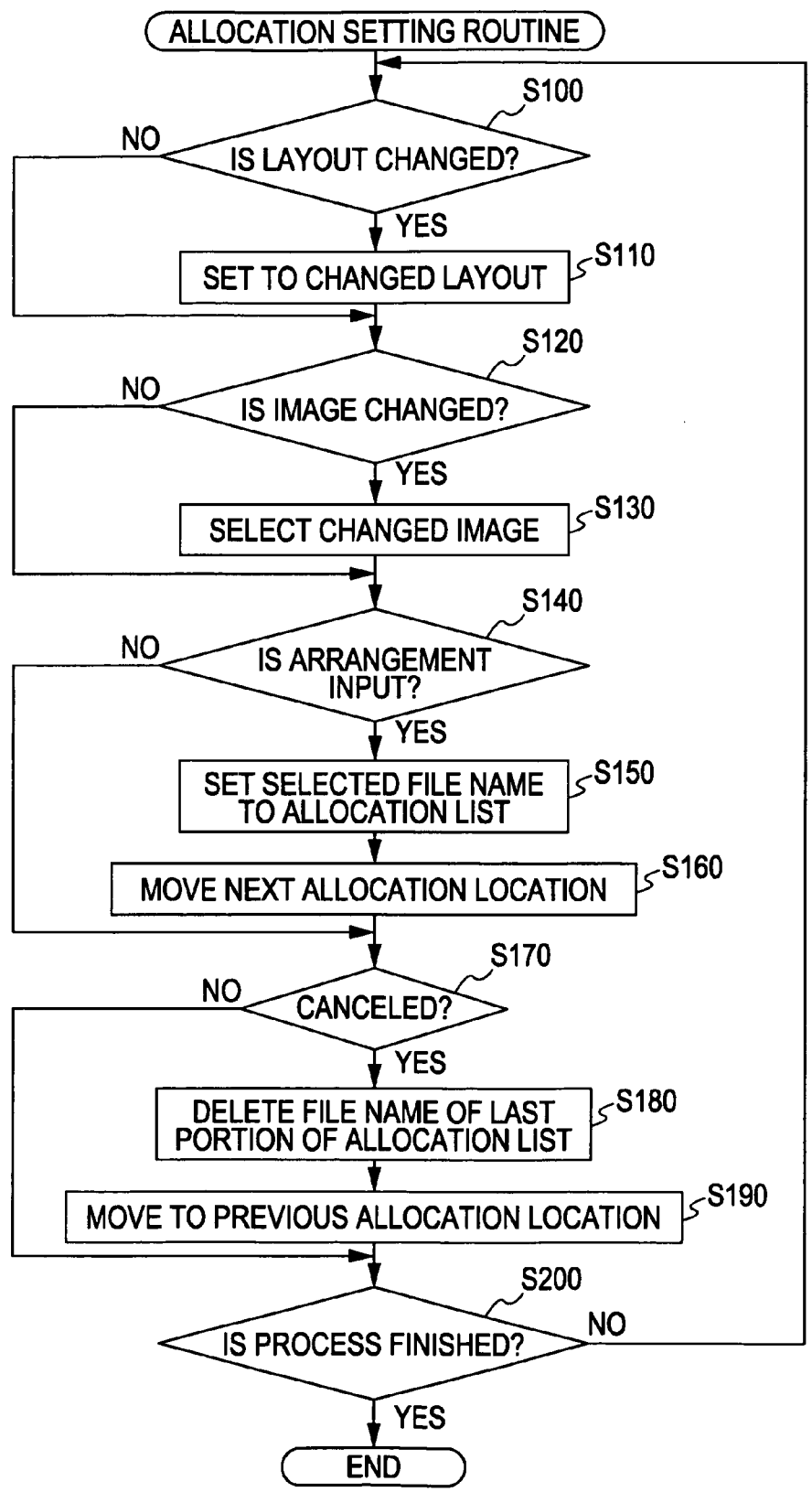
FIG. 3 is a flowchart showing an example of an allocation setting routine.
Figure 4:
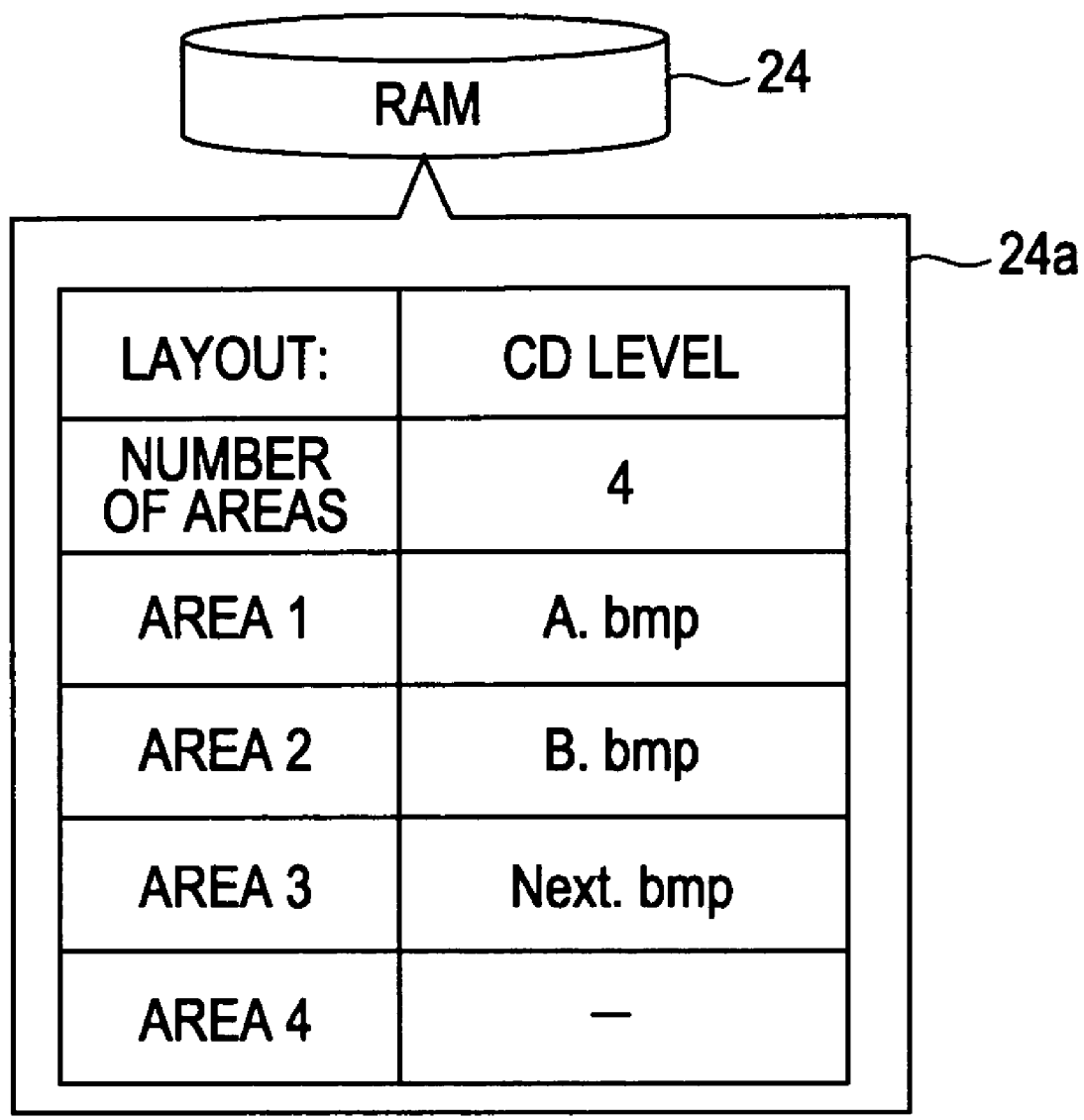
FIG. 4 is a view explaining an allocation list stored in a RAM.
Figure 6:
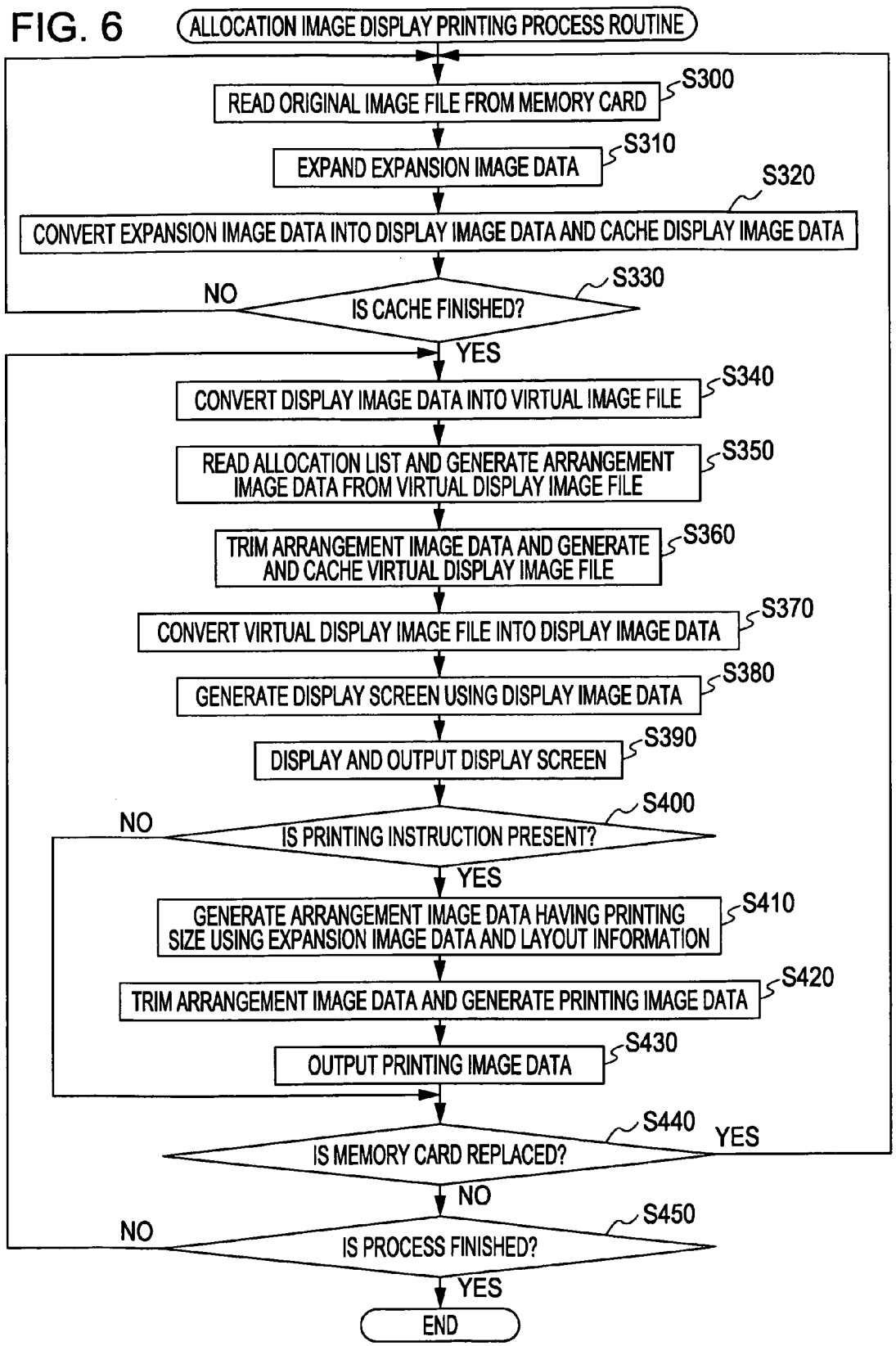
FIG. 6 is a flowchart showing an example of an allocation image display printing process routine.

Next, an operation of the printer 20 according to the present embodiment having the above-described configuration and, more particularly, an operation for displaying and printing the image in which the plurality of images is arranged will be described. FIG. 3 is a flowchart showing an example of an allocation setting routine. FIG. 4 is a view explaining an allocation list 24a stored in the RAM 24. FIG. 5 is a view explaining an example of a CD allocation printing screen 60. FIG. 6 is a flowchart showing an example of an allocation image display printing process routine. As shown in FIG. 5, the case where an image obtained by arranging a plurality of (in this embodiment, four) of images on a label surface of a CD and trimming the images in a circular plate shape having a hole in a central portion is displayed on the display unit 32 as the CD allocation printing screen 60 and a case where a printing process is performed by the printing mechanism 26 will be described in detail.

Now, the CD allocation printing screen 60 shown in FIG. 5 will be described. The CD allocation printing screen 60 includes a selected image display portion 62 for displaying an image which is currently selected or a layout image display portion 64 for displaying an image in which a plurality of images is arranged in a predetermined layout as target images of a user. The layout image display portion 64 is configured by arranging four images on the label surface of the CD in all directions and trimming the images in the circular plate shape, and a first area 64a, a second area 64b, a third area 64c and a fourth area 64d are arranged from the left upper side in a clockwise direction. In the layout image display portion 64, an arrangement location indication image P which is a hatched semi-transmissive image is arranged at an allocation location where an image will be next arranged. In addition, the arrangement location indication image P is stored in the RAM 24 as a virtual image file called "Next.bmp". In addition, the state of the allocation list 24a shown in FIG. 4 corresponds to the display contents of the CD allocation printing screen 60 shown on the upper side of FIG. 5. In addition, the arrangement location indication image P may not be virtualized or may be stored in the flash ROM 23.

First, a method for setting an allocation image will be described. The allocation setting routine shown in FIG. 3 is stored in the flash ROM 23 and is executed after a choice "A plurality of images is arranged and printed" is selected on a function selection screen (not shown). In this routine, a process of deciding the contents of the allocation list 24a shown in FIG. 4 is performed. When this routine is executed, the CPU 22 first determines whether or not a layout change is instructed depending on whether or not a layout change button (not shown) of the operation unit 34 is pressed (step S100). As the layout, a "CD label" in which the four images are arranged on the label surface, an "album" in which 2×4 images are arranged (see FIG. 7 which will be described later), and a "portable character arrangement" in which a photographic image and a character image received from the mobile phone 50 are arranged (see FIG. 8 which will be described later)) are registered. If the layout change button is pressed in the step S100, the CPU 22 sets the changed layout in a column "layout" of the allocation list 24a (step S110).

After the step S110 or when the layout change button is pressed in the step S100, the CPU 22 determines whether or not the image is changed depending on whether or not left/right keys of the cursor key 34a are pressed (step S120) and sets the changed image as the image, which is currently selected (the image displayed on the selected image display portion 62 of FIG. 5), when the left/right keys are pressed (step S130). After the step S130 or when the image is not changed in the step S120, it is determined whether or not an instruction for arranging the image which is currently selected is input (step S140). When the up/down keys of the cursor key 34a are pressed, the cursor is arranged on "arrange this photo", and when the decision key 34b is pressed, it is determined that the arrangement of the image which is currently selected is instructed. In addition, when the decision key 34b is pressed in a state in which the cursor is placed at a location "arrange blank", it is determined that a blank image is arranged at a current arrangement indication location. When the arrangement is instructed, the file name of the image which is currently selected is set to an "area" which is currently selected in the allocation list 24a (step S150), and the "area" which is currently selected is moved to a next allocation location (step S160).

After the step S160 or when the arrangement is not instructed in the step S140, the CPU 22 determines whether or not a cancel is instructed depending on whether or not the cancel key 34c is pressed (step S170), the file name which is set to the "area" which is currently selected in the allocation list 24a is deleted when the cancel is instructed (step S180), and the "area" which is currently selected is moved to a previous allocation location (step S190). That is, the state is returned to a preceding state. After the step S190 or when the cancel is not instructed in the step S170, it is determined whether or not the allocation process is finished depending on whether or not an OK key (not shown) is pressed (step S200). The process after the step S100 is executed when the allocation process is not finished and this routine is finished when the allocation process is finished. The following screen displaying and printing process is performed using the prepared allocation list 24a.

Next, the operation for preparing and displaying the allocation image and performing the printing process using the allocation list 24a, which is shown in FIG. 6, will be described. The allocation image display printing process routine shown in FIG. 6 is stored in the flash ROM 23, is concurrently executed with the allocation setting routine, and is executed by the CPU 22 using the display processing unit 40 or the printing engine 44. When this routine is executed, the CPU 22 reads the thumbnail image of the original image data from the memory card 12 (step S300), and is expanded to the expansion image data of the thumbnail by the JPEG decoder 41 (step S310). Next, the CPU 22 converts the expansion image data into the display image data by the format convertor 40a of the display processing unit 40 and caches the display image data in the UI cache 43 (step S320). It is determined whether or not all original image data is cached in the UI cache 43 (step S330). If all the original image is not cached, the process after the step S300 is executed and, if all the original image is cached, the cached display image data 43a is converted into the virtual image file by the format converter 40a (step S340). The display image data 43a (RGB data) is exchanged and is virtually converted into the virtual image file 43b (bitmap file) so as to be recognized by the file manager 45.

Next, the CPU 22 reads the allocation list 24a stored in the RAM 24 and generates the arrangement image data using the virtual image file 43b stored in the allocation list 24a or the layout information (step S350). The CPU 22 outputs the arrangement image generation instruction to the display processing unit 40 and outputs the arrangement image generation instruction, which is the instruction for generating the arrangement image for display by the display processing unit 40, together with the allocation list 24a and the layout information to the printing engine 44. Next, the CPU 22 performs a trimming process such that the outer shape of the generated arrangement image data becomes the circular plate shape having the hole at the central portion thereof, converts the trimmed arrangement image data into the virtual display image file 43c by the arrangement image generator 44a, and caches the virtual image data file in the UI cache 43 (step S360). Next, the CPU 22 reads the cached virtual display image file 43c and converts the virtual display image file into the display image data by the format convertor 40a (step S370). Subsequently, the CPU 22 prepares the CD allocation printing screen 60 shown in FIG. 6 using the screen-nail of the image which is currently selected or the display image data of the image data in which the plurality of images is allocated (step S380) and outputs the CD allocation printing screen 60 on the operation panel 30 (step S390).

Now, the motion of the CD allocation printing screen 60 shown in FIG. 6 will be described in association with the allocation setting routine and the allocation image display printing process routine. First, in an initial state, since the images of the memory card 12 arranged in a plurality of arrangement areas are not set, the CPU 22 generates an image in which the arrangement location indication image P is arranged at an initial location using the function of the format convertor 40a or the arrangement image generator 44a, and displays the image on the display unit 32. The user operates the operation unit 34 and sets the images displayed on the selected image display portion 62 in several areas displayed on the layout image display portion 64. When the user instructs the image displayed on the selected image display portion 62 to be arranged, the CPU 22 stores it in the allocation list 24a, arranges the image which is instructed to be arranged at the current allocation location, and, at the same time, arranges the arrangement location indication image P to overlap with a next allocation location, the arrangement image generator 44a generates the arrangement image data, and the format convertor 40a converts the data into data of a displayable format. Then, the CD allocation printing screen 60 is prepared and displayed on the display unit 32 (from the upper end to the lower end of FIG. 5). Meanwhile, if the allocation state of any allocation area is cancelled, the image file name of the cancelled allocation location is deleted from the allocation list 24a and the motion opposite to that described above is performed using the allocation list 24a and the screen is returned to the preceding screen (from the lower end to the upper end of FIG. 5).

When the display screen is displayed and output, the CPU 22 determines whether or not the arrangement printing instruction for instructing the printing of the arrangement image in which the plurality of images is arranged is received, depending on whether or not a printing start button (not shown) is pressed (step S400). If the arrangement printing instruction is received, the CPU 22 outputs an arrangement printing instruction, which is a printing instruction of the arrangement image data, from the display processing unit 40 to the printing engine 44, reads the original image data from the memory card 12, outputs the expansion image data expanded by the JPEG decoder 41 and the layout information to the printing engine 44, and generates the arrangement image data having a printing sheet size by the arrangement image generator 44a (step S410). Subsequently, the CPU 22 trims the generated arrangement image data and generates printing image data from the trimmed image data (step S420), and outputs the generated printing image data to the printing mechanism 26 (step S430). In the printing mechanism 26, a printing process of driving a driving motor, rotating a supply roller, and transporting a recording sheet S onto a printable area of a platen, driving a carriage motor, and ejecting inks on the recording sheet S as coloring agents on the basis of the printing image data while a carriage is moved in a carriage movement direction is performed.

After the step S430 or when the printing instruction is not received in the step S400, the CPU 22 determines whether or not the memory card 12 is replaced on the basis of the signal from the reader/writer 25 (step S440) and, if the memory card 12 is replaced, the process after the step S300 is executed. In contrast, if the memory card 12 is not replaced, it is determined whether or not the process of generating the allocation image is finished, for example, whether or not a printing mode other than the allocation image printing is selected or whether or not power is turned off (step S450). The process after the step S340 is performed if the process of generating the allocation image is not finished and this routine is finished if the process of generating the allocation image is finished.

Since the image displayed on the display unit 32 is generated using the function used when the printing engine 44 generates the printing image data, for example, the function for arranging the plurality of images and generating a synthetic image or the function for trimming the images to a predetermined outer shape, this function may not be included in the display processing unit 40. In addition, since the same display image as the printing image is generated, a difference between the display image and the printing image hardly occurs.

Next, in the allocation setting routine, the case where the "album" is set as the layout will be described. FIG. 7 is a view explaining an example of an allocation printing screen 70. This allocation printing screen 70 includes a selected image display portion 72 for displaying an image which is currently selected or a layout image display portion 74 for displaying an image in which a plurality of images is arranged in a predetermined layout as target images of a user. The layout image display portion 74 is configured by arranging eight images directed laterally in a 2×4 matrix, and a first area 74a, a second area 74b, a third area 74c, a fourth area 74d, . . . are arranged in order of the left upper side, the right side, and the lower side. This allocation printing screen 70 is prepared by the same process as the above-described routine except that the outer shape is not trimmed in the circular plate shape in the step S360 and the step S420 of the above-described allocation image display printing process routine. Even in this case, the same effect as the CD allocation printing screen 60 can be obtained.

Figure 8:
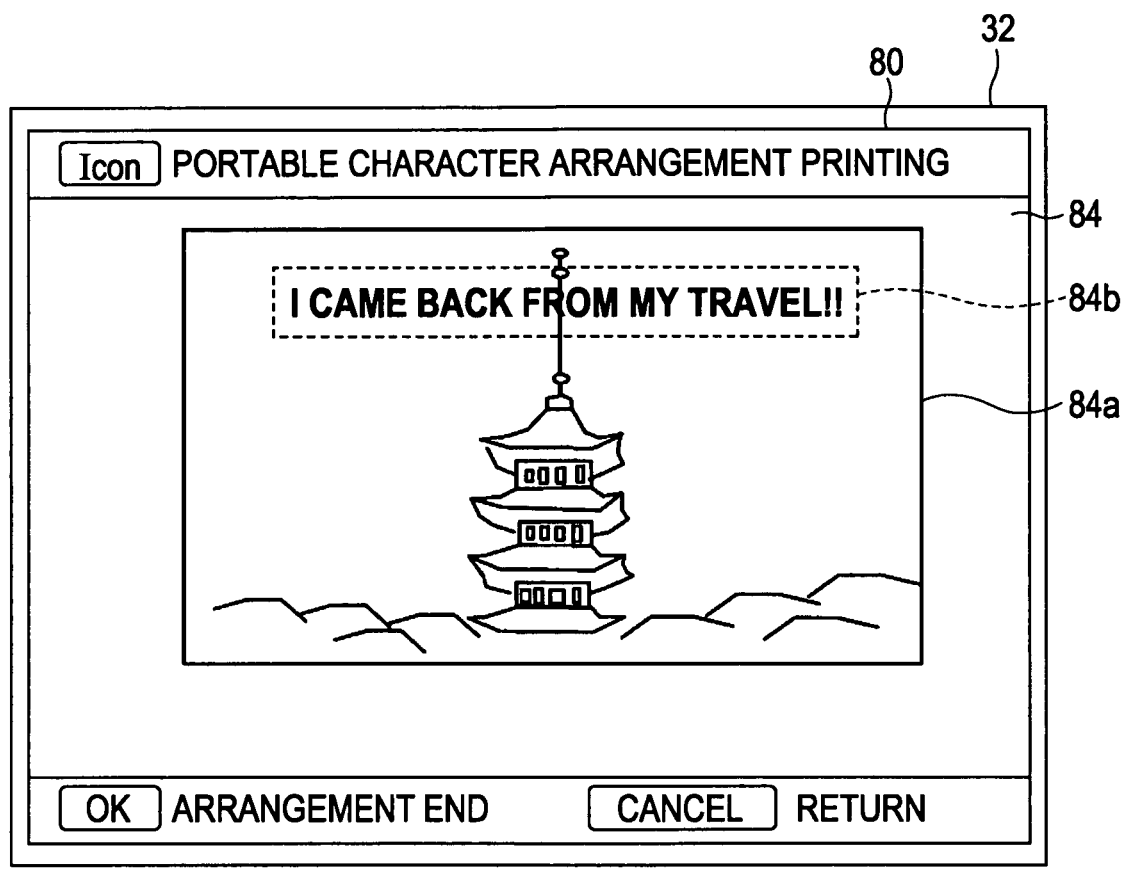
FIG. 8 is a view showing an example of a portable character arrangement printing screen.

Next, in the allocation setting routine, the case where the "portable character arrangement" is set as the layout will be described. FIG. 8 is a view showing an example of a portable character arrangement printing screen 80. This portable character arrangement printing screen 80 includes the layout image display portion 84 for displaying an image in which a plurality of images is arranged in a predetermined layout as target images of a user. This layout image display portion 84 includes a first area 84a for arranging a photographic image and a second area 84b for arranging a character image. In the portable character arrangement printing, if the "portable character arrangement" is set as the layout in the allocation setting routine, a mode for acquiring the original image data transmitted from the mobile telephone 50 via the external communication I/F 28 is switched and executed. At this time, the user operates the operation unit 54 of the mobile telephone 50, displays a portable character arrangement transmission screen (not shown) on the display unit 53, selects a photographic image which is first printed, and transmits the photographic image to the printer 20. Subsequently, the operation unit 54 is operated and the input character is transmitted to the printer 20. Then, in the printer 20, the photographic image is arranged back, the process of arranging the character image on the photographic image at a predetermined location is executed by the printing engine 44, the same process as that described above is performed, and the portable character arrangement printing screen 80 is displayed and output on the display unit 32 by the display processing unit 40. At this time, the printing engine 44 generates the image data of the character image using the printing font 44b of the printing engine 44. The printing engine 44 has a larger number of fonts than that of the display processing unit 40 such that any characters to be input can be printed. The character image displayed on the display unit 32 is generated by the printing engine 44 using printing fonts 44b having a large number of fonts.

Now, the correspondence between the components of the present embodiment and the components of the invention will be clarified. The display unit 32 of the present embodiment corresponds to a display unit of the invention, the display processing unit 40 and the JPEG decoder 41 corresponds to a display image processing unit, the JPEG decoder 41 corresponds to an image expansion unit, the printing mechanism 26 corresponds to a printing mechanism, the printing engine 44 corresponds to a printing process unit, the RAM 24 corresponds to a storage unit, the file manager 45 corresponds to a file processing unit, and a format converter 40a corresponds to a data converting unit. In addition, the ink corresponds to a coloring agent and the recording sheet S corresponds to a printing medium. In addition, in the present embodiment, an example of the print control method of the invention is clarified by describing the operation of the printer 20.

According to the above-described printer 20 of the present embodiment, an arrangement generation instruction is output to the printing engine 44 using at least one image specified by the display processing unit 40 and the layout information, the arrangement image data is generated by the printing engine 44 using the specified image and the layout information and is output to the display processing unit 40, the display image data is generated from the arrangement image data by the display processing unit 40, and the display screen prepared by including the generated display image data is output and displayed on the display unit 32. In addition, when the arrangement printing instruction is acquired, the arrangement printing instruction is output from the display processing unit 40 to the printing engine 44, the printing image data of the arrangement image data is generated by the printing engine 44 using the image specified by the arrangement printing instruction and the layout information, and the printing image data is output to the printing mechanism 26. If the plurality of images is arranged, since the printing engine 44 for executing the printing process prepares the laid-out display image data and printing image data, that is, prepares common layout data, a plurality of modules for arranging the plurality of images and generating the display screen may not be included. In addition, since the printing engine 44 for actually performing printing prepares the display image, a difference between the display image and the printing image hardly occurs. Accordingly, when the plurality of images is laid out, the configuration can be more simplified and an image closer to the printed image can be provided.

In addition, since the single display image data used for display is converted into the virtual image file and the virtual image file is used, the expansion of the original image can be omitted when the display image is prepared. Thus, the process of arranging and displaying the plurality of images can be executed for a shorter time. In addition, although the data formats used in the display processing unit 40 and the printing engine 44 may be different, since the data format used by the display processing unit 40 is first converted by the format converter 40a, the image can be properly displayed. In addition, since the display image in which the arrangement location indication image P is arranged is generated, the image for easily recognizing the location where the image is next arranged can be provided. In addition, since the arrangement image obtained by trimming the printing image data or the arrangement image data in the predetermined shape is generated by the printing engine 44, the module for trimming the image is shared between the display side and the print side, the configuration can be more simplified. Since the arrangement image data is generated using a smaller number of pieces of image data, a memory capacity or a processing load can be reduced and the process of arranging and displaying the plurality of images can be executed for a shorter time. Since the display image is generated using printing fonts 44b having a larger number of fonts, the character can be more accurately displayed. In addition, a larger number of characters can be displayed without increasing the types of the display fonts 40b.

In addition, the invention is not limited to the above-described embodiments and may be variously modified within the technical scope of the invention.

For example, although the arrangement image data is trimmed in the CD allocation printing in the above-described embodiments, the arrangement image data may be trimmed in any shape in the allocation printing of the album or the portable character arrangement printing. In addition, although the image trimmed at the time of the CD allocation printing is displayed, the image which is not trimmed may be displayed. In addition, although the CD allocation printing, the album printing and the portable character arrangement printing are described in the above-described embodiments, at least one of these functions may be included and other layouts may be applied to the invention.

Although the display image data 43a is converted into the virtual file and the virtual file is used for generating the arrangement image data in the above-described embodiments, for example, the virtual file may be directly acquired from the JPEG decoder 41 via the file manager 45 and the conversion may be omitted. In this case, the processing speed is decreased, but the configuration is more simplified, and an image closer to the printed image can be provided.

Although the arrangement image data is generated using thumbnail data having a small image size in the above-described embodiments, the arrangement image data may be generated using image data having a printing size and then the size thereof may be reduced to an arrangement size of the display unit 32. In this case, the memory capacity needs to be increased, but the configuration is more simplified, and an image closer to the printed image can be provided.

Although the arrangement location indication image P is arranged and the display screen is generated in the above-described embodiments, this may be omitted. In addition, in the CD allocation printing screen 60 or the allocation printing screen 70, the selected image display portion may not be provided.

Although the number of fonts of the printing fonts 44b is larger than that of display fonts 40b in the above-described embodiments, the number of printing fonts and the number of display fonts may be equal. Even in this case, the configuration is more simplified and an image closer to the printed image can be provided.

Although the printer 20 is described as the image processing apparatus of the invention in the above-described embodiments, a printing apparatus such as a multifunction printer including a scanner and a FAX may be used. In addition, although the ink jet type printing mechanism 26 is included in the above-described printer 20, the invention is not limited to this. A color dot impact type, color electrophotographic type, or color thermal-transfer type printing mechanism may be used and a monochrome type printing mechanism may be used. Although the printer 20 is described in the above-described embodiments, a print control apparatus, a print control method or a program thereof may be employed.

What is claimed is:

1. A print control apparatus comprising a display processing unit and a printing process unit so as to execute a printing process,
    wherein the display processing unit includes:
    a unit arranging a plurality of images in a predetermined layout and acquiring an arrangement printing instruction for executing printing;
    a unit outputting the arrangement printing instruction, which is a printing output instruction, to the printing process unit using at least one specified image and layout information of the image;
    a unit outputting an arrangement image generation instruction for generating the arrangement image data to the printing process unit using at least one specified image and layout information which is information about the arrangement of the image;
    a unit which, when arrangement image data of a predetermined format is acquired from the printing process unit as a response of the arrangement image generation instruction, generates display image data from the acquired arrangement image data and outputs the generated display image data to a display unit; and
    a display image processing unit, and
    wherein the printing process unit includes:
    a unit generating printing image data of the arrangement image data using at least one image specified by the arrangement printing instruction and the layout information when the arrangement printing instruction is acquired, and outputting the generated printing image data to a printing mechanism for forming an image on a printing medium using a coloring agent; and
    a unit generating the arrangement image data using at least one image specified by the arrangement image generation instruction and the layout information when the arrangement image generation instruction is acquired, and outputting the generated arrangement image data to the display image processing unit.

2. The print control apparatus according to claim 1, further comprising:
    a storage unit storing data; and
    a file processing unit sending or receiving an image file of a predetermined format to or from the printing process unit as an analyzable data,
    wherein the display image processing unit has an image expansion unit which expands an original image compressed in a predetermined format to image data, the display image data is generated by expanding the original image of the image specified by the arrangement image generation instruction by the image expanding unit, and the generated display image data is stored in the storage unit as a virtual image file of the predetermined format, and
    wherein the printing process unit acquires the virtual image file stored in the storage unit via the file processing unit as the at least one image specified by the arrangement image generation instruction when the arrangement image generation instruction is acquired, generates the arrangement image data using the acquired virtual image file, and stores the generated arrangement image data in the storage unit as a virtual arrangement image file.

3. The print control apparatus according to claim 1, wherein:
the display image processing unit has a data converting unit which converts data of a predetermined format into data of a format capable of being displayed by the display unit and generates display image data from the original image by the data converting unit,
the printing process unit generates the arrangement image data using the data converted by the data converting unit, and
the display image processing unit generates the display image data from the acquired arrangement image data by the data converting unit when the arrangement image data of the predetermined format is acquired as the response of the arrangement image generation instruction.

4. The print control apparatus according to claim 1, wherein:
the display image processing unit outputs the arrangement image generation instruction including information about an arrangement location indication image which is an image of a location, in which an image is next arranged, of image arrangement locations of display images having a plurality of image arrangement locations, and generates the display image data from the acquired arrangement image data when the arrangement image data including the arrangement location indication image is acquired as the response of the arrangement image generation instruction, and
the printing process unit generates the arrangement image data including the arrangement location indication image when the arrangement image generation instruction including the arrangement location indication image is acquired.

5. The print control apparatus according to claim 1, wherein the printing process unit generates the arrangement image data obtained by trimming the whole image, in which a plurality of images is arranged, in a predetermined shape when the arrangement image data is generated, and outputs the generated arrangement image data to the display image processing unit.

6. The print control apparatus according to claim 1, wherein:
the display image processing unit generates display image data having a smaller size than that of the printing process when the display image data is generated from the original image, and
the printing process unit generates the arrangement image data using the display image data having the smaller size.

7. The print control apparatus according to claim 1, wherein:
the display image processing unit has information about display fonts used for displaying a character image, generates display image data of the character image from the original image of the character image using the display fonts, and outputs the generated display image data to the display unit, and
the printing process unit has a larger number of printing font information than the number of display fonts, and generates the arrangement image data from the character image specified by the arrangement image generation instruction using the printing fonts when the arrangement image generation instruction is acquired.

8. A printing apparatus comprising:
a print control apparatus according to claim 1;
a display unit displaying and outputting a display image acquired from the print control apparatus; and
a printing mechanism printing and outputting printing image data acquired from the print control apparatus on a printing medium.

9. A print control method using a display image processing unit generating display image data from an original image and outputting the generated display image data to a display unit, and a printing process unit generating arrangement image data in which a plurality of images is arranged and executing a printing process, the method comprising:
outputting an arrangement image generation instruction for generating the arrangement image data from the display image processing unit to the printing process unit using at least one specified image and the layout information which is information about the arrangement of the image;
when the output arrangement image generation instruction is acquired, generating the arrangement image data using at least one image specified by the arrangement image generation instruction and layout information and outputting the generated arrangement image data from the printing process unit to the display image processing unit;
when the output arrangement image data is acquired, generating display image data from the acquired arrangement image data by the display image processing unit and outputting the generated display image data to the display unit;
arranging a plurality of images in a predetermined layout and outputting an arrangement printing instruction, which is a printing output instruction, from the display image processing unit to the printing process unit using at least one specified image and layout information which is information about the arrangement of the image when the arrangement printing instruction for executing printing is acquired; and
generating printing image data of the arrangement image data by the printing process unit using at least one image specified by the arrangement printing instruction and the layout information when the arrangement printing instruction is acquired, and outputting the generated printing image data to a printing mechanism for forming an image on a printing medium using a coloring agent.

10. A non-transitory computer readable medium having a program stored thereon for executing the print control method according to claim 9 on at least one computer.

* * * * *